(12) United States Patent
Wu et al.

(10) Patent No.: US 11,855,739 B2
(45) Date of Patent: Dec. 26, 2023

(54) TECHNIQUES FOR BEAM MANAGEMENT FOR SECONDARY COMPONENT CARRIER

(71) Applicant: QUALCOMM Incorporated, San Diego, CA (US)

(72) Inventors: Yongle Wu, San Diego, CA (US); Girish Khandelwal, San Diego, CA (US); Srinivasan Mecheri Govindarajan, San Diego, CA (US); Priyanka Yenigalla, Erie, CO (US); Shanshan Wang, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/656,494

(22) Filed: Mar. 25, 2022

(65) Prior Publication Data

US 2022/0337305 A1 Oct. 20, 2022

Related U.S. Application Data

(60) Provisional application No. 63/201,244, filed on Apr. 20, 2021.

(51) Int. Cl.
*H04B 7/10* (2017.01)
*H04B 7/08* (2006.01)
*H04W 36/30* (2009.01)

(52) U.S. Cl.
CPC ......... *H04B 7/0857* (2013.01); *H04B 7/088* (2013.01); *H04W 36/305* (2018.08)

(58) Field of Classification Search
CPC .... H04B 7/0695; H04B 7/088; H04B 17/309; H04B 7/0632; H04B 7/0413; H04W 72/23; H04W 24/10; H04W 72/542; H04L 5/0098; H04L 5/00; H04L 5/0078
USPC .......................................................... 375/347
See application file for complete search history.

(56) References Cited

U.S. PATENT DOCUMENTS

| | | | |
|---|---|---|---|
| 2019/0215888 A1* | 7/2019 | Cirik | H04W 76/19 |
| 2020/0403682 A1* | 12/2020 | Koskela | H04B 7/0695 |
| 2021/0037397 A1* | 2/2021 | Guo | H04W 72/046 |
| 2022/0149918 A1* | 5/2022 | Miao | H04B 7/0695 |
| 2022/0149922 A1* | 5/2022 | Wang | H04W 76/19 |

OTHER PUBLICATIONS

International Search Report and Written Opinion—PCT/US2022/071377—ISA/EPO—dated Jul. 14, 2021.

* cited by examiner

*Primary Examiner* — Khai Tran
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may establish a communication link using a first serving beam on a secondary component carrier (SCC). The UE may identify a link failure associated with the first serving beam. The UE may transmit an out-of-range indication associated with the first serving beam in association with the link failure. The UE may report measurement information for one or more candidate serving beams. The UE may receive an indication of a second serving beam from the one or more candidate serving beams. The UE may switch to the second serving beam for the SCC. Numerous other aspects are described.

30 Claims, 9 Drawing Sheets

TECHNIQUES FOR BEAM MANAGEMENT FOR SECONDARY COMPONENT CARRIER

CROSS-REFERENCE TO RELATED APPLICATION

This patent application claims priority to U.S. Provisional Patent Application No. 63/201,244, filed on Apr. 20, 2021, entitled "TECHNIQUES FOR BEAM MANAGEMENT FOR SECONDARY COMPONENT CARRIER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam management for a secondary component carrier (SCC).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing a communication link using a first serving beam on a secondary component carrier (SCC); identifying a link failure associated with the first serving beam; transmitting, based at least in part on identifying the link failure associated with the first serving beam, a channel quality indicator to a base station; reporting measurement information for one or more candidate serving beams; receiving an indication of a second serving beam from the one or more candidate serving beams; and switching to the second serving beam for the SCC.

In some aspects, the method includes foregoing control channel monitoring on the first serving beam in association with the link failure.

In some aspects, the method includes tracking a measurement value for the first serving beam and the one or more candidate serving beams after transmitting the out-of-range indication.

In some aspects, the measurement information includes at least one of: a Layer 1 reference signal received power (RSRP), or a Layer 3 RSRP.

In some aspects, the measurement information indicates one or more preferred beams that are quasi-colocated with the first serving beam, and the transmission of the measurement information further comprises: transmitting a channel state information reference signal resource indicator indicating the one or more preferred beams in association with a synchronization signal block of the first serving beam.

In some aspects, the measurement information indicates one or more preferred beams that are quasi-colocated with a serving beam of the one or more candidate serving beams, and the transmission of the measurement information further comprises: transmitting a channel state information reference signal resource indicator indicating the one or more preferred beams in association with a synchronization signal block of the one or more candidate serving beams.

In some aspects, the indication of the second serving beam indicates, via medium access control signaling, a transmission configuration indicator state associated with the second serving beam.

In some aspects, the measurement information is first measurement information, and the establishment of the communication link further comprises: selecting the first serving beam from second measurement information available prior to establishing the communication link.

In some aspects, a single synchronization signal block is enabled for the UE, and the establishment of the communication link further comprises: selecting the single synchronization signal block for the first serving beam.

In some aspects, multiple synchronization signal blocks are enabled for the UE without available measurement information, and the method further comprises: pausing loop updates associated with selecting a serving beam for the SCC based at least in part on multiple synchronization signal blocks being enabled for the UE without available measurement information.

In some aspects, the reception of the indication of the second serving beam further comprises: receiving signaling indicating the second serving beam.

In some aspects, the reception of the indication of the second serving beam further comprises: selecting the second serving beam based at least in part on a synchronization signal block measurement associated with the second serving beam.

In some aspects, a method of wireless communication performed by a base station includes establishing, with a UE, a communication link using a first serving beam on an SCC; receiving a channel quality indicator associated with the first serving beam in association with a link failure of the first serving beam; receiving measurement information for one or more candidate serving beams; and switching to a second serving beam, of the one or more candidate serving beams, for the SCC.

In some aspects, the measurement information includes at least one of: a Layer 1 RSRP, or a Layer 3 RSRP.

In some aspects, the measurement information indicates one or more preferred beams that are quasi-colocated with the first serving beam, and the reception of the measurement information further comprises: receiving a channel state information reference signal resource indicator indicating the one or more preferred beams in association with a synchronization signal block of the first serving beam.

In some aspects, the measurement information indicates one or more preferred beams that are quasi-colocated with a serving beam of the one or more candidate serving beams, and the reception of the measurement information further comprises: receiving a channel state information reference signal resource indicator indicating the one or more preferred beams in association with a synchronization signal block of the one or more candidate serving beams.

In some aspects, the measurement information indicates one or more preferred beams that are not quasi-colocated with the first serving beam or the one or more candidate serving beams, and the reception of the measurement information further comprises: receiving an arbitrary channel state information reference signal resource indicator.

In some aspects, the indication of the second serving beam indicates, via medium access control signaling, a transmission configuration indicator state associated with the second serving beam.

In some aspects, the measurement information is first measurement information, and the establishment of the SCC associated with the first serving beam further comprises: selecting the first serving beam from second measurement information available prior to establishing the SCC associated with the first serving beam.

In some aspects, a single synchronization signal block is enabled for the UE, and the establishment of the SCC associated with the first serving beam further comprises: selecting the single synchronization signal block for the first serving beam.

In some aspects, the method includes transmitting signaling indicating the second serving beam.

In some aspects, a UE for wireless communication includes a memory; and one or more processors, coupled to the memory, configured to: establish a communication link using a first serving beam on an SCC; identify a link failure associated with the first serving beam; transmit, based at least in part on identifying the link failure associated with the first serving beam, a channel quality indicator to a base station; report measurement information for one or more candidate serving beams; receive an indication of a second serving beam from the one or more candidate serving beams; and switch to the second serving beam for the SCC.

In some aspects, the one or more processors are further configured to: forego control channel monitoring on the first serving beam in association with the link failure.

In some aspects, the one or more processors are further configured to: track a measurement value for the first serving beam and the one or more candidate serving beams after transmitting the out-of-range indication.

In some aspects, the measurement information includes at least one of: a Layer 1 RSRP, or a Layer 3 RSRP.

In some aspects, the measurement information indicates one or more preferred beams that are quasi-colocated with the first serving beam, and the one or more processors are configured, when transmitting the measurement information, to: transmit a channel state information reference signal resource indicator indicating the one or more preferred beams in association with a synchronization signal block of the first serving beam.

In some aspects, the measurement information indicates one or more preferred beams that are quasi-colocated with a serving beam of the one or more candidate serving beams, and the one or more processors are configured, when transmitting the measurement information, to: transmit a channel state information reference signal resource indicator indicating the one or more preferred beams in association with a synchronization signal block of the one or more candidate serving beams.

In some aspects, the indication of the second serving beam indicates, via medium access control signaling, a transmission configuration indicator state associated with the second serving beam.

In some aspects, the measurement information is first measurement information, and the one or more processors are configured, when establishing the communication link, to: select the first serving beam from second measurement information available prior to establishing the communication link.

In some aspects, a single synchronization signal block is enabled for the UE, and the one or more processors are configured, when establishing the communication link, to: select the single synchronization signal block for the first serving beam.

In some aspects, multiple synchronization signal blocks are enabled for the UE without available measurement information, and the one or more processors are further configured to: pause loop updates associated with selecting a serving beam for the SCC based at least in part on multiple synchronization signal blocks being enabled for the UE without available measurement information.

In some aspects, the one or more processors are configured, when receiving the indication of the second serving beam, to: receive signaling indicating the second serving beam.

In some aspects, the one or more processors are configured, when receiving the indication of the second serving beam, to: select the second serving beam based at least in part on a synchronization signal block measurement associated with the second serving beam.

In some aspects, a base station for wireless communication includes a memory; and one or more processors, coupled to the memory, configured to: establish, with a UE, a communication link using a first serving beam on an SCC; receive a channel quality indicator associated with the first serving beam in association with a link failure of the first serving beam; receive measurement information for one or more candidate serving beams; and switch to a second serving beam, of the one or more candidate serving beams, for the SCC.

In some aspects, the measurement information includes at least one of: a Layer 1 RSRP, or a Layer 3 RSRP.

In some aspects, the measurement information indicates one or more preferred beams that are quasi-colocated with the first serving beam, and the one or more processors are configured, when receiving the measurement information, to: receive a channel state information reference signal resource indicator indicating the one or more preferred beams in association with a synchronization signal block of the first serving beam.

In some aspects, the measurement information indicates one or more preferred beams that are quasi-colocated with a serving beam of the one or more candidate serving beams, and the one or more processors are configured, when receiving the measurement information, to: receive a channel state information reference signal resource indicator indicating the one or more preferred beams in association with a synchronization signal block of the one or more candidate serving beams.

In some aspects, the measurement information indicates one or more preferred beams that are not quasi-colocated with the first serving beam or the one or more candidate serving beams, and the one or more processors are configured, when receiving the measurement information, to: receive an arbitrary channel state information reference signal resource indicator.

In some aspects, the indication of the second serving beam indicates, via medium access control signaling, a transmission configuration indicator state associated with the second serving beam.

In some aspects, the measurement information is first measurement information, and the one or more processors are configured, when establishing the SCC associated with the first serving beam, to: select the first serving beam from second measurement information available prior to establishing the SCC associated with the first serving beam.

In some aspects, a single synchronization signal block is enabled for the UE, and the one or more processors are configured, when establishing the SCC associated with the first serving beam, to: select the single synchronization signal block for the first serving beam.

In some aspects, the one or more processors are further configured to: transmit signaling indicating the second serving beam.

In some aspects, a non-transitory computer-readable medium storing a set of instructions for wireless communication includes one or more instructions that, when executed by one or more processors of a UE, cause the UE to: establish a communication link using a first serving beam on an SCC; identify a link failure associated with the first serving beam; transmit, based at least in part on identifying the link failure associated with the first serving beam, a channel quality indicator to a base station; report measurement information for one or more candidate serving beams; receive an indication of a second serving beam from the one or more candidate serving beams; and switch to the second serving beam for the SCC.

In some aspects, a non-transitory computer-readable medium storing a set of instructions for wireless communication includes one or more instructions that, when executed by one or more processors of a base station, cause the base station to: establish, with a UE, a communication link using a first serving beam on an SCC; receive a channel quality indicator associated with the first serving beam in association with a link failure of the first serving beam; receive measurement information for one or more candidate serving beams; and switch to a second serving beam, of the one or more candidate serving beams, for the SCC.

In some aspects, an apparatus for wireless communication includes means for establishing a communication link using a first serving beam on an SCC; means for identifying a link failure associated with the first serving beam; means for transmitting, based at least in part on identifying the link failure associated with the first serving beam, a channel quality indicator to a base station; means for reporting measurement information for one or more candidate serving beams; means for receiving an indication of a second serving beam from the one or more candidate serving beams; and means for switching to the second serving beam for the SCC.

In some aspects, an apparatus for wireless communication includes means for establishing, with a UE, a communication link using a first serving beam on an SCC; means for receiving a channel quality indicator associated with the first serving beam in association with a link failure of the first serving beam; means for receiving measurement information for one or more candidate serving beams; and means for switching to a second serving beam, of the one or more candidate serving beams, for the SCC.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
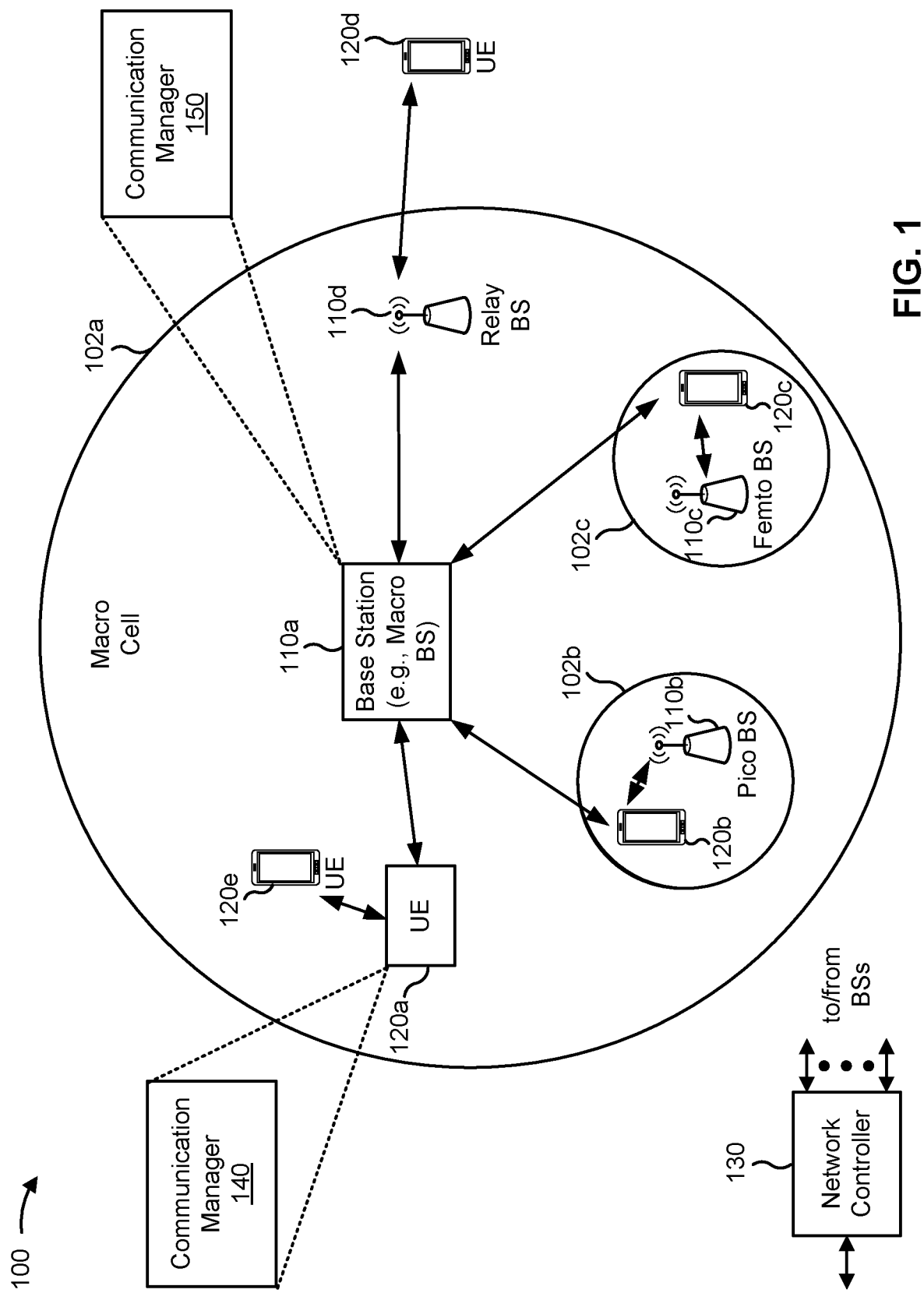
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., New Radio (NR)) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may establish a communication link using a first serving beam on an secondary component carrier (SCC); identify a link failure associated with the first serving beam; transmit an out-of-range indication associated with the first serving beam in association with the link failure; report measurement information for one or more candidate serving beams; receive an indication of a second serving beam from the one or more candidate serving beams; and switch to the second serving beam for the SCC. Additionally, or alternatively, the communication manager 140 may perform one or more other operations described herein.

In some aspects, the base station 110 may include a communication manager 150. As described in more detail elsewhere herein, the communication manager 150 may establish, with a UE, a communication link using a first serving beam on an SCC; receive an out-of-range indication associated with the first serving beam in association with a link failure of the first serving beam; receive measurement information for one or more candidate serving beams; and switch to a second serving beam, of the one or more candidate serving beams, for the SCC. Additionally, or alternatively, the communication manager 150 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station, 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
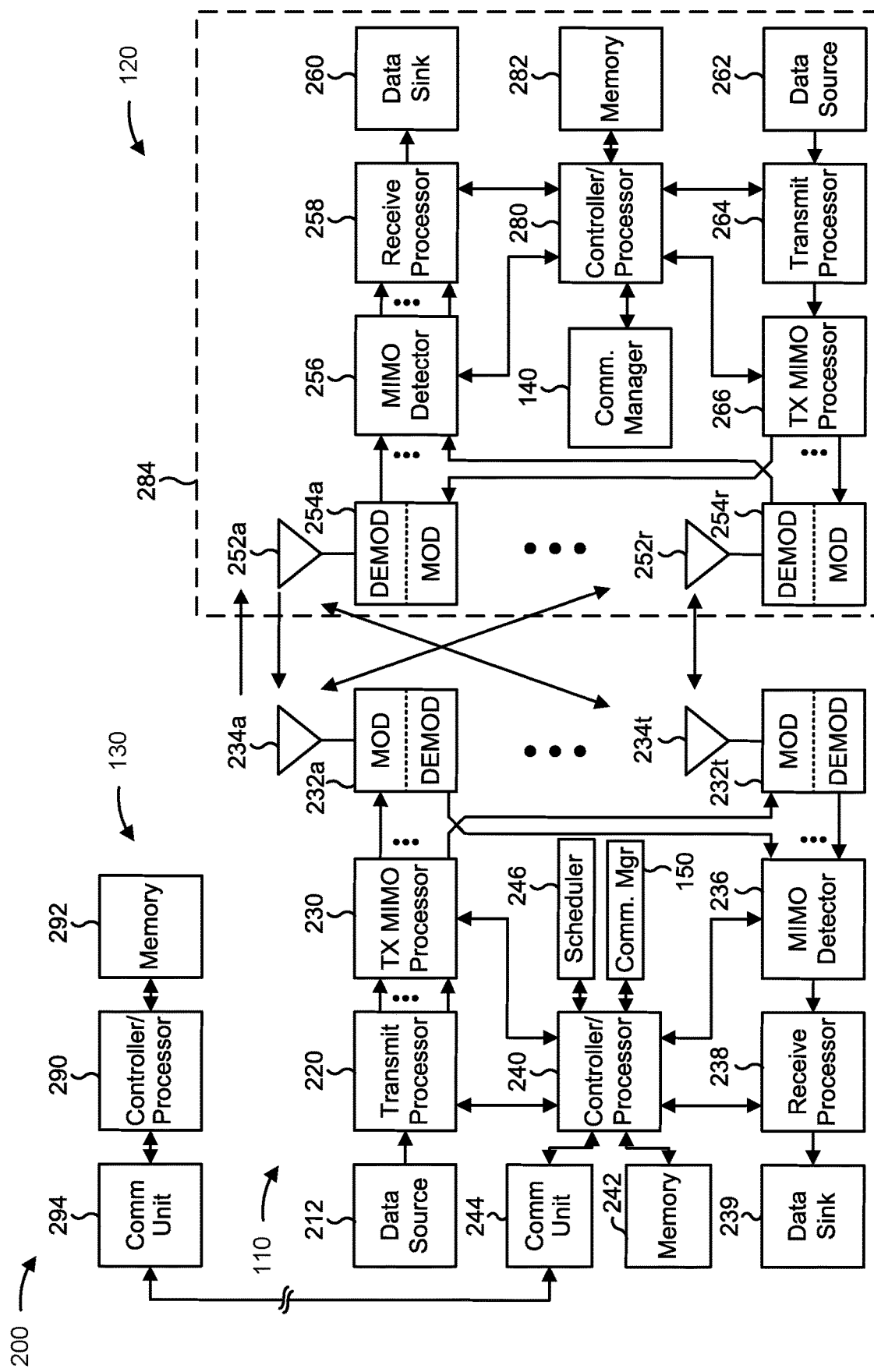
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-9).

Controller/processor 240 of base station 110, controller/processor 280 of UE 120, and/or any other component(s) of FIG. 2 may perform one or more techniques associated with beam management for an SCC, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions.

As indicated above, FIG. 2 is provided as an example. Other examples may differ from what is described with regard to FIG. 2.

Figure 3:
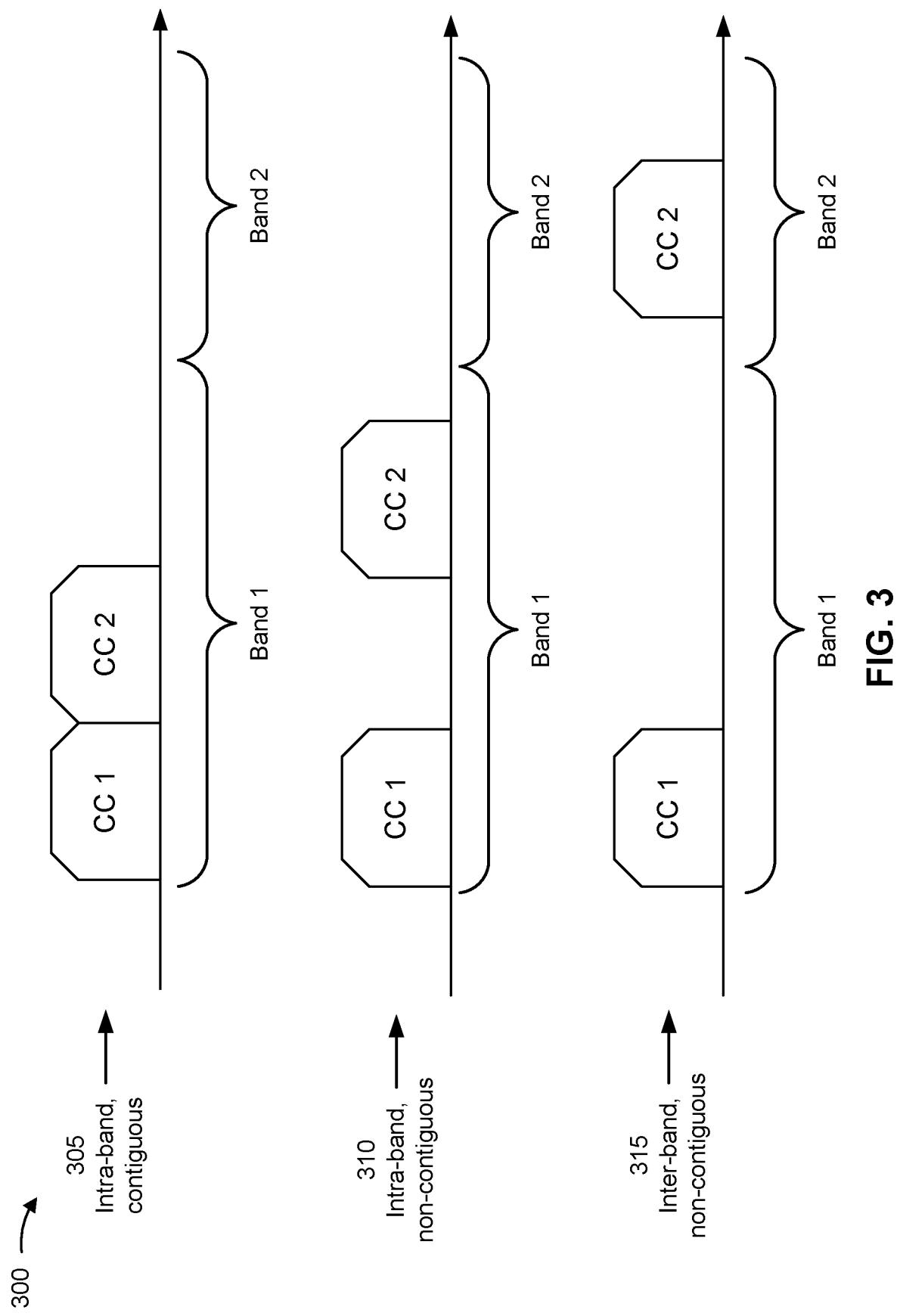
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network entity such as a base station 110 may configure carrier aggregation for a UE 120, such as in a radio resource control (RRC) message, downlink control information (DCI), and/or another signaling message.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary cell (PCell) and one or more secondary cells (SCells). For example, the UE may be camped on the PCell. On the PCell, the UE may be served by a primary component carrier (PCC). On the one or more SCells, the UE may be served by one or more SCCs. In some aspects, the PCC may carry control information (e.g., downlink control information and/or scheduling information) for scheduling data communications on one or more SCCs, which may be referred to as cross-carrier scheduling. In some aspects, a carrier (e.g., a PCC or an SCC) may carry control information for scheduling data communications on the carrier, which may be referred to as self-carrier scheduling or carrier self-scheduling. Generally, the SCCs are added and removed as required, while the PCC is changed at handover.

As indicated above, FIG. 3 is provided as an example. Other examples may differ from what is described with regard to FIG. 3.

Figure 4:
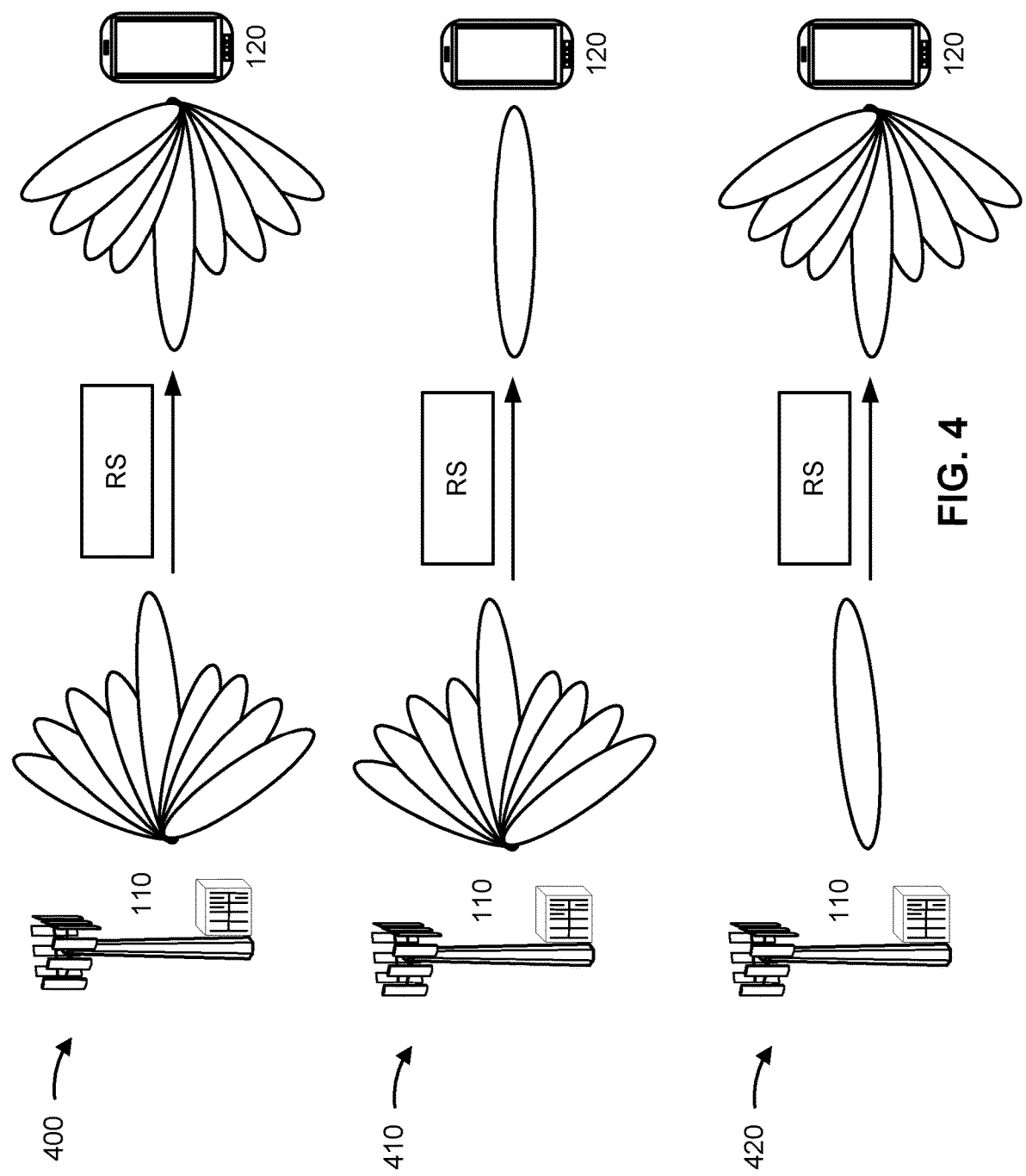
FIG. 4 is a diagram illustrating examples of beam management procedures, in accordance with the present disclosure.

FIG. 4 is a diagram illustrating examples 400, 410, and 420 of beam management procedures, in accordance with the present disclosure. As shown in FIG. 4, examples 400, 410, and 420 include a UE 120 in communication with a base station 110 in a wireless network (e.g., wireless network 100). However, the devices shown in FIG. 4 are provided as examples, and the wireless network may support communication and beam management between other devices (e.g., between a UE 120 and a base station 110 or TRP, between a mobile termination node and a control node, between an IAB child node and an IAB parent node, between a scheduled node and a scheduling node, and/or between a UE 120 and a DU or RU). In some aspects, the UE 120 and the base station 110 may be in a connected state (e.g., an RRC connected state).

As shown in FIG. 4, example 400 may include a base station 110 and a UE 120 communicating to perform beam management. Example 400 depicts a first beam management procedure (e.g., P1 channel state information reference signal (CSI-RS) beam management). The first beam management procedure may be referred to as a beam selection procedure, an initial beam acquisition procedure, a beam sweeping procedure, a cell search procedure, and/or a beam search procedure. As shown in FIG. 4 and example 400, reference signals may be configured to be transmitted from the base station 110 to the UE 120. The reference signals may be configured to be periodic (e.g., using RRC signaling), semi-persistent (e.g., using media access control (MAC) control element (MAC-CE) signaling), and/or aperiodic (e.g., using DCI). In some aspects, the reference signals may include a synchronization signal block (SSB) (also referred to as a synchronization signal/physical broadcast channel (SS/PBCH) block), one or more CSI-RSs, a combination thereof, or the like.

The first beam management procedure may include the base station 110 performing beam sweeping over multiple transmit (Tx) beams. The base station 110 may transmit a reference signal using each transmit beam for beam management. To enable the UE 120 to perform receive (Rx) beam sweeping, the base station may use a transmit beam to transmit (e.g., with repetitions) each reference signal at multiple times within the same reference signal (RS) resource set so that the UE 120 can sweep through receive beams in multiple transmission instances. For example, if the base station 110 has a set of N transmit beams and the UE 120 has a set of M receive beams, the reference signal may be transmitted on each of the N transmit beams M times so that the UE 120 may receive M instances of the reference signal per transmit beam. In other words, for each transmit beam of the base station 110, the UE 120 may perform beam sweeping through the receive beams of the UE 120. As a result, the first beam management procedure may enable the UE 120 to measure a reference signal on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120.

As shown in FIG. 4, example 410 may include a base station 110 and a UE 120 communicating to perform beam management using reference signals. Example 410 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 4 and example 410, reference signals may be configured to be transmitted from the base station 110 to the UE 120. The reference signals may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a reference signal using each transmit beam of the one or more transmit beams for beam management. The UE 120 may measure each reference signal using a single (e.g., a same) receive beam (e.g., determined based at least in part on measurements performed in connection with the first beam management procedure). The second beam management procedure may enable the base station 110 to select a best transmit beam based at least in part on measurements of the reference signals (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more reference signals may be configured to be transmitted from the base station 110 to the UE 120. The reference signals may be configured to be aperiodic (e.g., using DCI). The third beam management process may include the base station 110 transmitting the one or more reference signals using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) reference signals at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the reference signal of the transmit beam using the one or more receive beams).

The above-described beam management procedures may be applicable for a single component carrier, such as a PCC, or for multiple component carriers associated with the same serving beam. Some wireless communication systems, such as 5G/NR systems, facilitate inter-band carrier aggregation (such as in FR1) with two or more different base stations. For example, a first component carrier may be configured for a first base station, and a second component carrier may be configured for a second base station, where the first base station and the second base station are not co-located with each other. Thus, the first base station and the second base station may use different beams to communicate with a UE using inter-band carrier aggregation. When different beams are used to communicate with a UE using inter-band carrier aggregation, the above-described beam management procedures, which define signaling for a PCC or multiple component carriers associated with the same beam, may be inadequate for managing multiple component carriers with different beams. Thus, if a beam fails on an SCC, the above-described examples may not provide an adequate beam failure recovery procedure, which diminishes throughput and impedes the implementation of inter-band carrier aggregation in wireless communication systems such as those using 5G/NR.

Techniques and apparatuses described herein enable independent beam management for carrier aggregation, such as an inter-band carrier aggregation configuration using different beams for two or more component carriers. For example, techniques and apparatuses described herein enable beam selection of a serving beam for an SCC. As another example, techniques and apparatuses described herein provide link failure recovery for a beam on an SCC. For example, a UE may detect link failure on the SCC, and may signal information indicating the link failure (such as via the SCC). The UE may cease control channel monitoring on the SCC and may continue tracking beam reference signaling (such as described in connection with FIG. 3 above). The UE may report measurement information indicating beam measurements, such as a selected beam from a set of candidate beams. The UE and a base station that provides the SCC may switch the SCC to the selected beam. Thus, beam management independent of beam management for a PCC is provided, which enables the deployment of inter-band carrier aggregation configurations with non-co-located base stations. Thus, bandwidth is increased, throughput is increased, and reliability of carrier aggregation communications is improved.

As indicated above, FIG. 4 is provided as an example of beam management procedures. Other examples of beam management procedures may differ from what is described with respect to FIG. 4. For example, the UE 120 and the base station 110 may perform the third beam management procedure before performing the second beam management procedure, and/or the UE 120 and the base station 110 may perform a similar beam management procedure to select a UE transmit beam.

Figure 5:
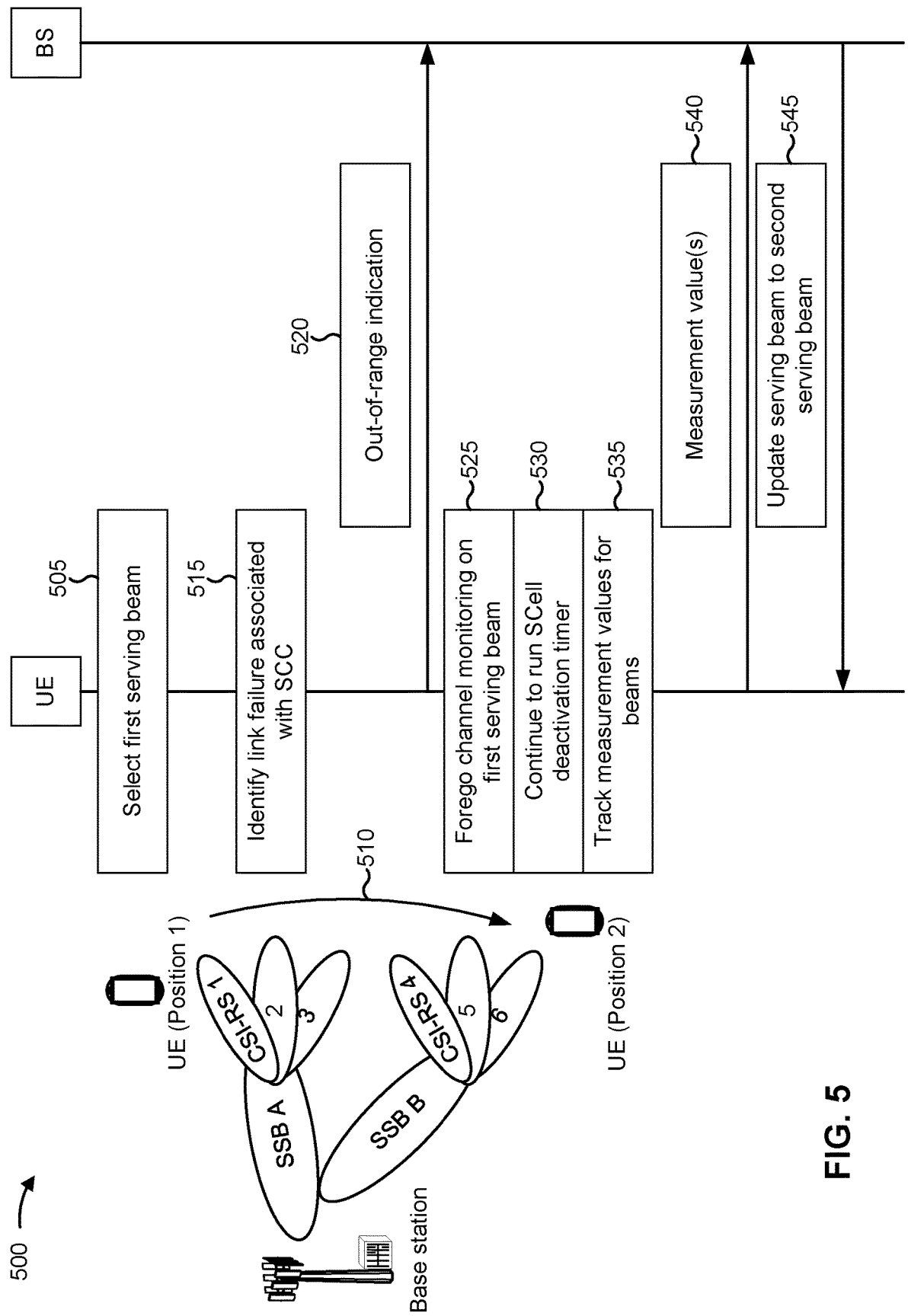
FIG. 5 is a diagram illustrating an example of signaling associated with beam management for a secondary component carrier (SCC), in accordance with the present disclosure.

FIG. 5 is a diagram illustrating an example 500 of signaling associated with beam management for an SCC, in accordance with the present disclosure. As shown, example 500 includes a UE (e.g., UE 120) and a base station (e.g., base station 110, a CU, a DU, an RU, or a combination thereof). The base station provides an SCC for the UE. For example, the UE may be associated with a carrier aggregation configuration, such as an inter-band carrier aggregation configuration in FR1. An SCC of the carrier aggregation configuration may be configured between the base station and the UE such that the UE can connect to an SCell provided by the base station. Another base station (not shown in FIG. 5) may provide a PCell, and the UE may be configured with a PCC between the UE and the other base station. In some aspects, "SCell" is used interchangeably with "SCC," and "PCell" is used interchangeably with "PCC."

Example 500 also shows a position of the UE changing from a first position (Position 1) to a second position (Position 2). The call flow diagram in the right portion of FIG. 5 shows signaling associated with selecting and updating a serving beam from a set of beams provided by the base station. As shown, the base station may be associated with two SSB beams and 6 CSI-RS beams. For example, the base station may transmit SSB A on a first beam (such as a wide beam) and may transmit SSB B on a second beam (such as a wide beam). SSB A's beam and SSB B's beam may be associated with different directions. Furthermore, SSB A may be associated with CSI-RS 1, 2, and 3, which may be transmitted on narrower beams than SSB A within a range of the first beam. Similarly, SSB B may be associated with CSI-RS 4, 5, and 6, which may be transmitted on narrower beams than SSB B within a range of the second beam.

As shown by reference number 505, the UE may select a first serving beam. A serving beam is a beam selected to perform signaling associated with a given component carrier. For example, a UE (and a corresponding base station) may select a serving beam for each component carrier of a carrier aggregation configuration. The techniques and apparatuses described herein enable independent selection and management of serving beams for each component carrier of a carrier aggregation configuration, which enables provision of the carrier aggregation configuration by non-co-located base stations. In example 500, the UE may select SSB A and/or CSI-RS 1's beam as the first serving beam (e.g., for reporting as a selected beam).

In some aspects, the UE may select the first serving beam based at least in part on a measurement. For example, if the UE has measurement information available (such as an RSRP measurement associated with a set of beams) for one or more SSBs (such as SSB A or SSB B), the UE may select a beam associated with a best SSB (such as an SSB associated with a strongest RSRP measurement) as a serving beam.

In some aspects, the UE may select the first serving beam based at least in part on an SSB being configured for the UE. For example, if only one SSB is enabled for the UE by the base station, then a beam corresponding to the one SSB may be selected as the serving beam, which conserves resources associated with measurement on a single SSB.

In some aspects, the UE may be associated with multiple configured SSBs (e.g., multiple enabled SSBs) and may not have measurement information available for the multiple configured SSBs. In such aspects, the UE may pause loop updates (such as the operations described in connection with FIG. 4) until the UE has determined measurement information regarding at least part of the multiple configured SSBs.

In some aspects, the UE may receive signaling indicating the first serving beam. For example, the UE may receive information indicating a transmission configuration indicator (TCI) state for the first serving beam. A TCI state includes information indicating a spatial parameter for a beam. For example, a TCI state may indicate a spatial parameter (such as a quasi-colocation parameter) and may identify a source reference signal from which the spatial parameter is to be derived. In some aspects, the UE may receive the information indicating the TCI state via RRC signaling, MAC signaling, DCI, or the like. In some aspects, the UE may receive signaling activating one or more TCI states and may select the beam from the one or more activated TCI states. For example, the UE may autonomously select the first serving beam as described above. In other aspects, the UE may receive information explicitly identifying a TCI state that is to be used for the first serving beam. In yet other aspects, the UE may follow a proprietary approach to select the first serving beam.

As shown by reference number 510, the UE may move from the first position to the second position. In such a situation, the first serving beam may fail. In some aspects, the base station may switch the serving beam of the SCC from the first serving beam to a second serving beam. For example, the base station may transmit, to the UE, information indicating the second serving beam. In example 500, however, the UE does not receive such information. For example, signaling of the information may fail due to, for example, deep fading of the channel, fast mobility of the UE, a malfunction of the base station or the UE, or the like.

As shown by reference number 515, the UE may identify a link failure associated with the SCC. For example, the UE may determine that a failure condition associated with the SCC and/or the first serving beam is satisfied. In some aspects, the failure condition may identify a threshold, such as a threshold beam measurement (such as Layer 1 RSRP, signal to interference plus noise ratio (SINR), or the like). The UE may track a beam measurement associated with the threshold while the SCC is activated. If the first serving beam and/or the SCC fails to satisfy the threshold, the UE may identify a link failure associated with the SCC.

As shown by reference number 520, the UE may transmit a CQI. In some aspects, the CQI may be an out-of-range indication. For example, the UE may transmit the out-of-range indication based at least in part on identifying the link failure associated with the SCC. The out-of-range indication may include, for example, CQI having an index of 0, which indicates an out of range state of the UE. The out-of-range indication may cause the base station to stop scheduling traffic on the SCC associated with the link failure.

As shown by reference number 525, the UE may forego control channel monitoring on the first serving beam. For example, the UE may forego the control channel monitoring (such as physical downlink control channel (PDCCH) monitoring) on the first serving beam based at least in part on identifying the link failure. The base station may cease transmitting control channels via the SCC based at least in part on the out-of-range indication. Thus, the UE and the base station may conserve signaling and monitoring resources associated with transmitting and monitoring control channels on a failed beam.

As shown by reference number 530, the UE may continue to run an SCell deactivation timer. An SCell deactivation timer indicates a time at which an SCell is deactivated if no signaling is received on an SCC associated with the SCell. If the UE receives a deactivation MAC-CE, or if the SCell deactivation timer expires, the UE may deactivate the SCell. For example, the UE may move to a true deactivated state.

As shown by reference number 535, the UE may track measurement values for one or more beams. For example, the UE may track measurement values for the first serving beam and one or more candidate serving beams after transmitting the out-of-range indication. The one or more candidate serving beams may include, for example, the beam associated with SSB A, the beam associated with SSB B, the beams associated with CSI-RSs 1-6, or other beams. In some aspects, the measurement value may be associated with an SSB, a CSI-RS, a combination thereof, or the like. In some aspects, the UE may continue SSB measurement and may cease CSI-RS measurement.

As shown by reference number 540, the UE may report measurement information for the one or more candidate serving beams. For example, the UE may transmit a measurement report indicating measurement values of the one or more candidate serving beams and/or the first serving beam. The measurement report may identify, for example, a Layer 1 RSRP, a Layer 3 RSRP, or the like. In some aspects, the UE may filter the measurement report. For example, the UE may identify one or more preferred beams (such as a best N beams based at least in part on measurement values, where N is an integer) and may transmit a measurement report identifying the one or more preferred beams and/or one or more measurement values associated with the one or more preferred beams.

In example 500, the UE may report a measurement value for SSB B if SSB based Layer 1 (L1) RSRP measurement reporting is configured. The UE may report any of CSI-RSs 4-6 via a CSI-RS resource indicator if a CSI-RS based measurement report is configured.

In some aspects, the UE may receive a TCI state update from the base station, such as via MAC signaling. The TCI state update may update a TCI state associated with the SCC. For example, the TCI state update may indicate an updated serving SSB or other reference signal associated with the SCC. If the UE receives the TCI state update, the UE may update the serving beam associated with the SCC. In some aspects, the UE may continue to forego the control channel monitoring and/or transmit an out-of-range indication. In some other aspects, the UE may resume control channel monitoring and/or transmit a CQI with a non-zero value (e.g., a CQI that is not an out-of-range indication). In some aspects, the base station may transmit the TCI state update based at least in part on the reported measurement value. For example, the base station may update the TCI state to correspond to a reference signal associated with the reported measurement value.

In some aspects, the UE may transmit a CSI-RS resource indicator (CRI). The CRI may indicate indexes of one or more CSI-RSs, such as a set of CSI-RSs associated with a best measurement value or a measurement value that satisfies a threshold. In some aspects, the UE may cease CSI-RS measurement while the link failure is identified. In such aspects, the UE may report a CRI such that one or more CSI-RS indexes identified by the CRI are quasi-colocated (e.g., associated with a same spatial parameter) with a strongest SSB. For example, if one or more CSI-RSs are mapped to an SSB associated with a strongest measurement value for a current CC (e.g., the SCC in example 500), then the UE may transmit a CRI identifying at least one of the one or more CSI-RSs. As another example, if the one or more CSI-RSs are mapped to an SSB associated with a strongest measurement value for another CC, then the UE may transmit a CRI identifying at least one of the one or more CSI-RSs. If no CSI-RS is mapped to an SSB associated with a strongest measurement value, then the UE may report an arbitrary CRI. Thus, the UE may report a preferred SSB beam by transmitting a CRI identifying a CSI-RS mapped to the preferred SSB beam. In this way, the UE may avoid reporting wrong CSI-RS information while CSI-RS measurement is paused due to identifying the link failure.

As shown by reference number 545, the BS may update the serving beam of the UE to a second serving beam. For example, the UE may receive an indication of the second serving beam. In some aspects, the UE may determine the indication of the second serving beam. In some aspects, the indication may be a TCI state update, as described above. As shown, the UE may determine that the link failure is not present while using the second serving beam. Thus, the UE and the base station may recover from link failure on the SCC while continuing to perform beam measurement and reporting for the SCC. In this way, bandwidth is increased, throughput is increased, and reliability of carrier aggregation communications is improved.

As indicated above, FIG. 5 is provided as an example. Other examples may differ from what is described with regard to FIG. 5.

Figure 6:
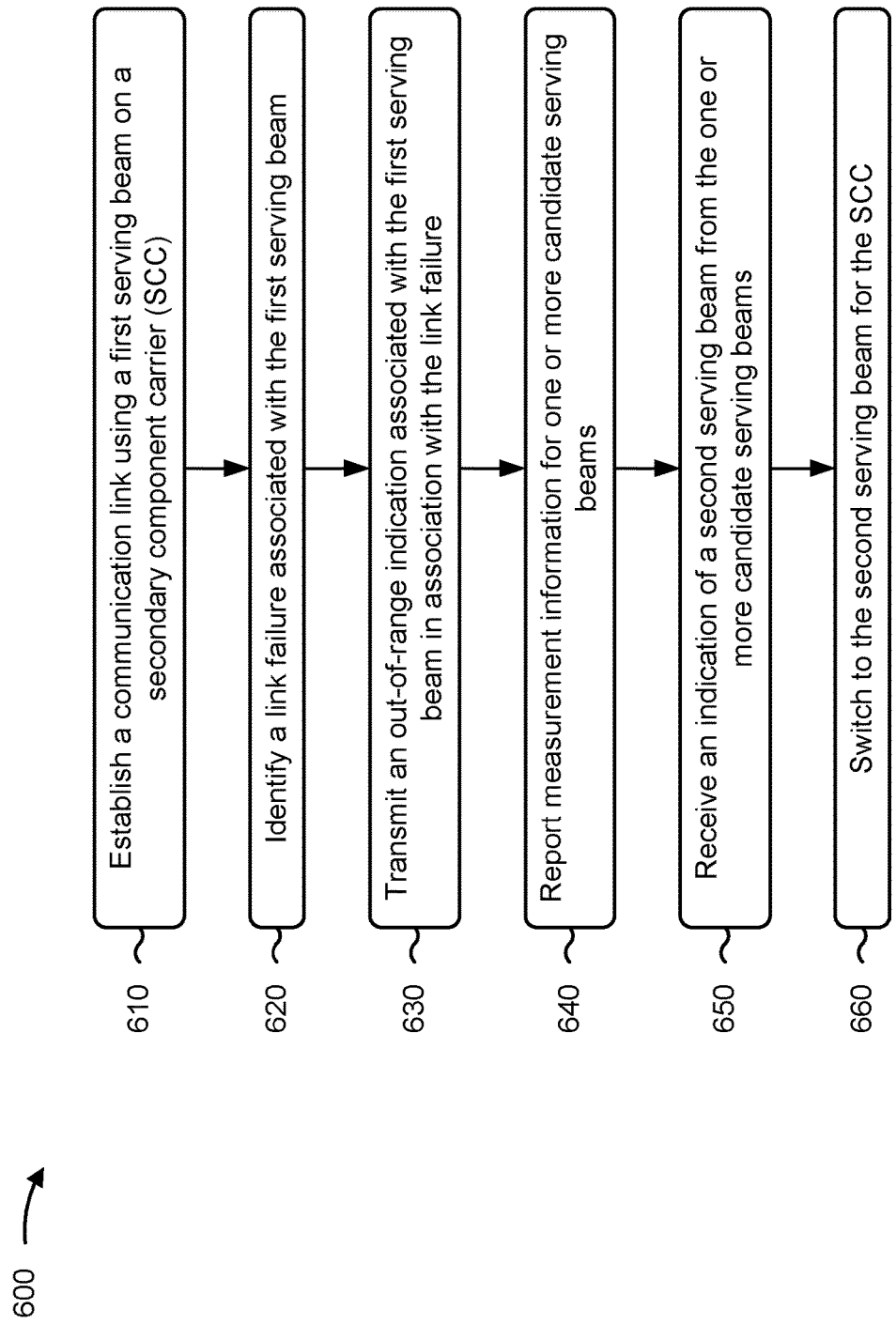
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with beam management for an SCC.

As shown in FIG. 6, in some aspects, process 600 may include establishing a communication link using a first serving beam on an SCC (block 610). For example, the UE (e.g., using establishment component 808, depicted in FIG. 8) may establish a communication link using a first serving beam on an SCC, as described above.

As further shown in FIG. 6, in some aspects, process 600 may include identifying a link failure associated with the first serving beam (block 620). For example, the UE (e.g., using identification component 810, depicted in FIG. 8) may identify a link failure associated with the first serving beam, as described above.

As further shown in FIG. 6, in some aspects, process 600 may include transmitting an out-of-range indication associated with the first serving beam in association with the link failure (block 630). For example, the UE (e.g., using transmission component 804, depicted in FIG. 8) may transmit an out-of-range indication associated with the first serving beam in association with the link failure, as described above. In some aspects, the out-of-range indication is a channel quality indicator.

As further shown in FIG. 6, in some aspects, process 600 may include reporting measurement information for one or more candidate serving beams (block 640). For example, the UE (e.g., using transmission component 804, depicted in FIG. 8) may report measurement information for one or more candidate serving beams, as described above.

As further shown in FIG. 6, in some aspects, process 600 may include receiving an indication of a second serving beam from the one or more candidate serving beams (block 650). For example, the UE (e.g., using reception component 802, depicted in FIG. 8) may receive an indication of a second serving beam from the one or more candidate serving beams, as described above.

As further shown in FIG. 6, in some aspects, process 600 may include switching to the second serving beam for the SCC (block 660). For example, the UE (e.g., using reception component 802, depicted in FIG. 8) may switch to the second serving beam for the SCC, as described above.

Process 600 may include additional aspects, such as any single aspect or any combination of aspects described below and/or in connection with one or more other processes described elsewhere herein.

In a first aspect, process 600 includes foregoing control channel monitoring on the first serving beam in association with the link failure.

In a second aspect, alone or in combination with the first aspect, process 600 includes tracking a measurement value for the first serving beam and the one or more candidate serving beams after transmitting the out-of-range indication.

In a third aspect, alone or in combination with one or more of the first and second aspects, the measurement information includes at least one of a Layer 1 RSRP, or a Layer 3 RSRP.

In a fourth aspect, alone or in combination with one or more of the first through third aspects, the measurement information indicates one or more preferred beams that are quasi-colocated with the first serving beam, and wherein the transmission of the measurement information further comprises transmitting a channel state information reference signal resource indicator indicating the one or more preferred beams in association with a synchronization signal block of the first serving beam.

In a fifth aspect, alone or in combination with one or more of the first through fourth aspects, the measurement information indicates one or more preferred beams that are quasi-colocated with a serving beam of the one or more candidate serving beams, and wherein the transmission of the measurement information further comprises transmitting a channel state information reference signal resource indicator indicating the one or more preferred beams in association with a synchronization signal block of the one or more candidate serving beams.

In a sixth aspect, alone or in combination with one or more of the first through fifth aspects, the indication of the second serving beam indicates, via medium access control signaling, a transmission configuration indicator state associated with the second serving beam.

In a seventh aspect, alone or in combination with one or more of the first through sixth aspects, the measurement information is first measurement information, and wherein the establishment of the communication link further comprises selecting the first serving beam from second measurement information available prior to establishing the communication link.

In an eighth aspect, alone or in combination with one or more of the first through seventh aspects, a single synchronization signal block is enabled for the UE, and wherein the establishment of the communication link further comprises selecting the single synchronization signal block for the first serving beam.

In a ninth aspect, alone or in combination with one or more of the first through eighth aspects, multiple synchronization signal blocks are enabled for the UE without available measurement information, and wherein the method further comprises pausing loop updates associated with selecting a serving beam for the SCC based at least in part on multiple synchronization signal blocks being enabled for the UE without available measurement information.

In a tenth aspect, alone or in combination with one or more of the first through ninth aspects, the reception of the indication of the second serving beam further comprises receiving signaling indicating the second serving beam.

In an eleventh aspect, alone or in combination with one or more of the first through tenth aspects, the reception of the indication of the second serving beam further comprises selecting the second serving beam based at least in part on a synchronization signal block measurement associated with the second serving beam.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
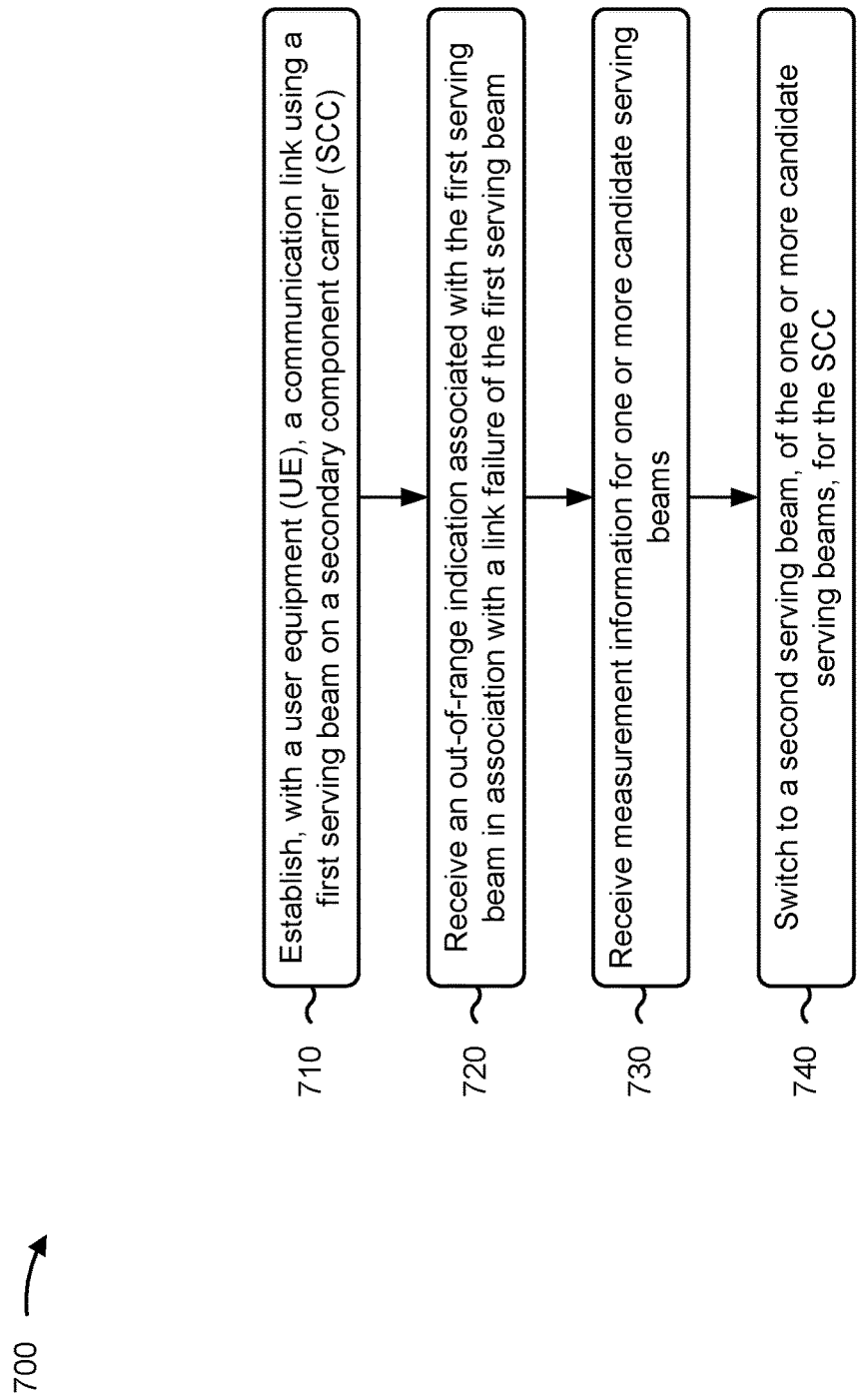
FIG. 7 is a diagram illustrating an example process performed, for example, by a network entity, in accordance with the present disclosure.

FIG. 7 is a diagram illustrating an example process 700 performed, for example, by a base station, in accordance with the present disclosure. Example process 700 is an example where the base station (e.g., base station 110) performs operations associated with techniques for beam management for secondary component carrier.

As shown in FIG. 7, in some aspects, process 700 may include establishing, with a UE, a communication link using a first serving beam on an SCC (block 710). For example, the base station (e.g., using establishment component 908, depicted in FIG. 9) may establish, with a UE, a communication link using a first serving beam on an SCC, as described above.

As further shown in FIG. 7, in some aspects, process 700 may include receiving an out-of-range indication associated with the first serving beam in association with a link failure of the first serving beam (block 720). For example, the base station (e.g., using reception component 902, depicted in FIG. 9) may receive an out-of-range indication associated with the first serving beam in association with a link failure of the first serving beam, as described above. In some aspects, the out-of-range indication is a channel quality indicator.

As further shown in FIG. 7, in some aspects, process 700 may include receiving measurement information for one or more candidate serving beams (block 730). For example, the base station (e.g., using reception component 902, depicted in FIG. 9) may receive measurement information for one or more candidate serving beams, as described above.

As further shown in FIG. 7, in some aspects, process 700 may include switching to a second serving beam, of the one or more candidate serving beams, for the SCC (block 740). For example, the base station (e.g., using transmission component 904, depicted in FIG. 9) may switch to a second serving beam, of the one or more candidate serving beams, for the SCC, as described above.

Process 700 may include additional aspects, such as any single aspect or any combination of aspects described below and/or in connection with one or more other processes described elsewhere herein.

In a first aspect, the measurement information includes at least one of a Layer 1 RSRP, or a Layer 3 RSRP.

In a second aspect, alone or in combination with the first aspect, the measurement information indicates one or more preferred beams that are quasi-colocated with the first serving beam, and wherein the reception of the measurement information further comprises receiving a channel state information reference signal resource indicator indicating the one or more preferred beams in association with a synchronization signal block of the first serving beam.

In a third aspect, alone or in combination with one or more of the first and second aspects, the measurement information indicates one or more preferred beams that are quasi-colocated with a serving beam of the one or more candidate serving beams, and wherein the reception of the measurement information further comprises receiving a channel state information reference signal resource indicator indicating the one or more preferred beams in association with a synchronization signal block of the one or more candidate serving beams.

In a fourth aspect, alone or in combination with one or more of the first through third aspects, the measurement information indicates one or more preferred beams that are not quasi-colocated with the first serving beam or the one or more candidate serving beams, and wherein the reception of the measurement information further comprises receiving an arbitrary channel state information reference signal resource indicator.

In a fifth aspect, alone or in combination with one or more of the first through fourth aspects, the indication of the second serving beam indicates, via medium access control signaling, a transmission configuration indicator state associated with the second serving beam.

In a sixth aspect, alone or in combination with one or more of the first through fifth aspects, the measurement information is first measurement information, and wherein the establishment of the SCC associated with the first serving beam further comprises selecting the first serving beam from second measurement information available prior to establishing the SCC associated with the first serving beam.

In a seventh aspect, alone or in combination with one or more of the first through sixth aspects, a single synchronization signal block is enabled for the UE, and wherein the establishment of the SCC associated with the first serving beam further comprises selecting the single synchronization signal block for the first serving beam.

In an eighth aspect, alone or in combination with one or more of the first through seventh aspects, process 700 includes transmitting signaling indicating the second serving beam.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
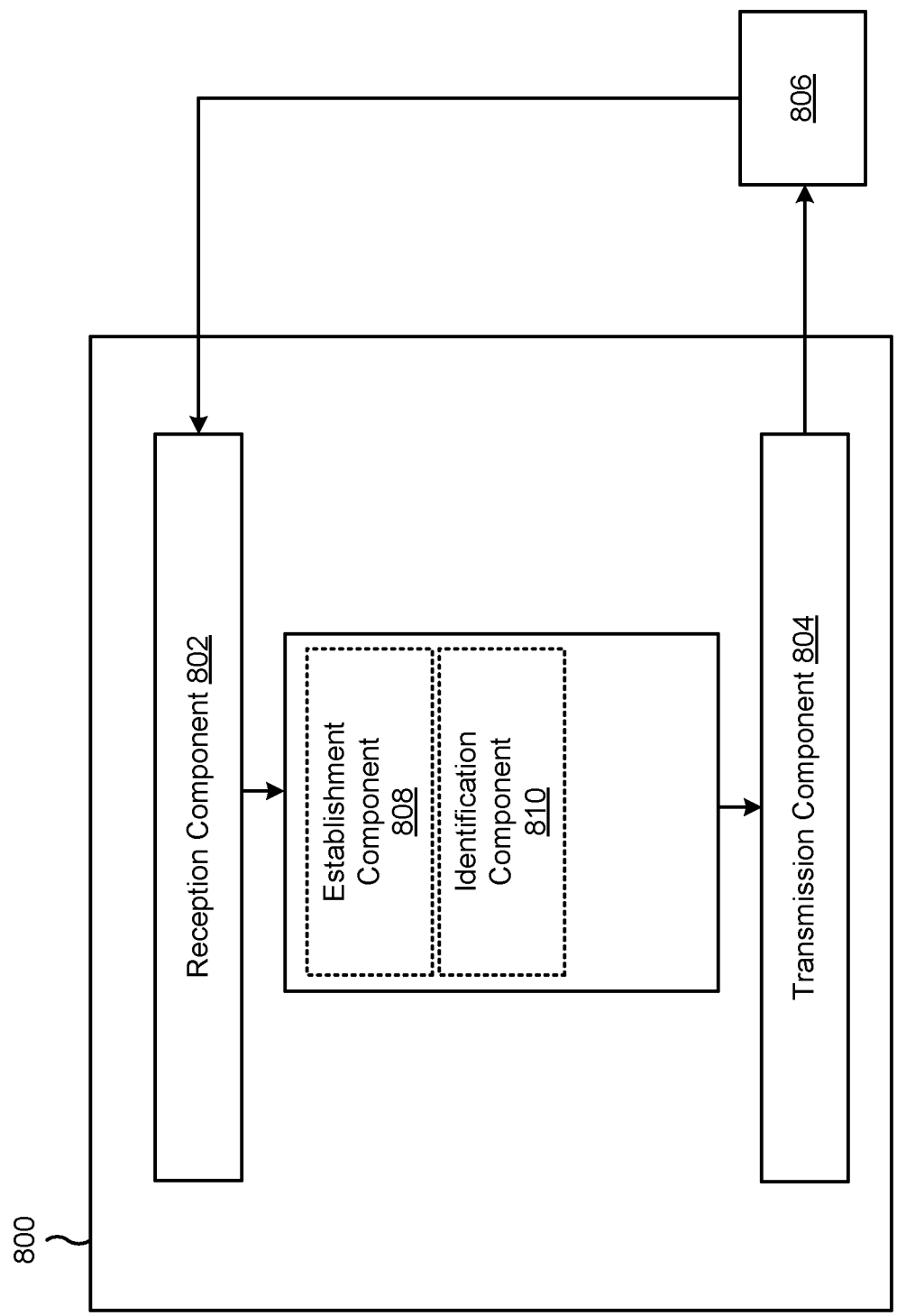
FIG. 8 is a block diagram of an example apparatus for wireless communication, in accordance with the present disclosure.

FIG. 8 is a block diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of an establishment component 808 or an identification component 810, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The establishment component 808 may establish a communication link using a first serving beam on an SCC. The identification component 810 may identify a link failure associated with the first serving beam. The transmission component 804 may transmit an out-of-range indication associated with the first serving beam in association with the link failure. The transmission component 804 may report measurement information for one or more candidate serving beams. The reception component 802 may receive an indication of a second serving beam from the one or more candidate serving beams. The reception component 802 may switch to the second serving beam for the SCC.

The reception component 802 may forego control channel monitoring on the first serving beam in association with the link failure.

The reception component 802 may track a measurement value for the first serving beam and the one or more candidate serving beams after transmitting the out-of-range indication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
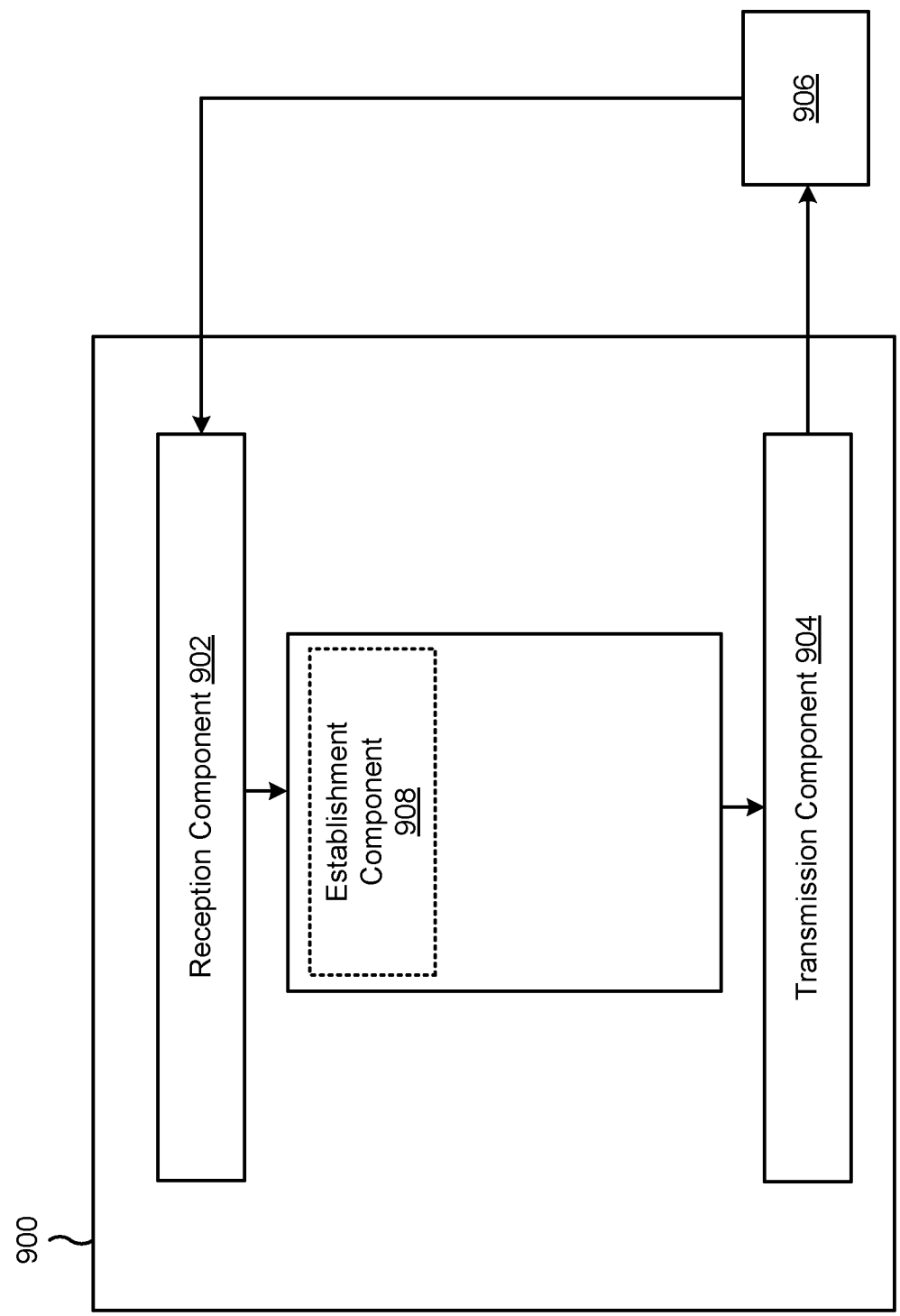
FIG. 9 is a block diagram of an example apparatus for wireless communication, in accordance with the present disclosure.

FIG. 9 is a block diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include an establishment component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The establishment component 908 may establish, with a UE, a communication link using a first serving beam on an SCC. The reception component 902 may receive an out-of-range indication associated with the first serving beam in association with a link failure of the first serving beam. The reception component 902 may receive measurement information for one or more candidate serving beams. The transmission component 904 may switch to a second serving beam, of the one or more candidate serving beams, for the SCC.

The transmission component 904 may transmit signaling indicating the second serving beam.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: establishing a communication link using a first serving beam on a secondary component carrier (SCC); identifying a link failure associated with the first serving beam; transmitting, based at least in part on identifying the link failure associated with the first serving beam, a channel quality indicator to a base station; reporting measurement information for one or more candidate serving beams; receiving an indication of a second serving beam from the one or more candidate serving beams; and switching to the second serving beam for the SCC.

Aspect 2: The method of Aspect 1, further comprising: foregoing control channel monitoring on the first serving beam in association with the link failure.

Aspect 3: The method of Aspect 1, further comprising: tracking a measurement value for the first serving beam and the one or more candidate serving beams after transmitting the channel quality indicator.

Aspect 4: The method of Aspect 1, wherein the measurement information includes at least one of: a Layer 1 reference signal received power (RSRP), or a Layer 3 RSRP.

Aspect 5: The method of Aspect 1, wherein the measurement information indicates one or more preferred beams that are quasi-colocated with the first serving beam, and wherein the transmission of the measurement information further comprises: transmitting a channel state information reference signal resource indicator indicating the one or more preferred beams in association with a synchronization signal block of the first serving beam.

Aspect 6: The method of Aspect 1, wherein the measurement information indicates one or more preferred beams that are quasi-colocated with a serving beam of the one or more candidate serving beams, and wherein the transmission of the measurement information further comprises: transmitting a channel state information reference signal resource indicator indicating the one or more preferred beams in association with a synchronization signal block of the one or more candidate serving beams.

Aspect 7: The method of Aspect 1, wherein the indication of the second serving beam indicates, via medium access control signaling, a transmission configuration indicator state associated with the second serving beam.

Aspect 8: The method of Aspect 1, wherein the measurement information is first measurement information, and wherein the establishment of the communication link further comprises: selecting the first serving beam from second measurement information available prior to establishing the communication link.

Aspect 9: The method of Aspect 1, wherein a single synchronization signal block is enabled for the UE, and wherein the establishment of the communication link further comprises: selecting the single synchronization signal block for the first serving beam.

Aspect 10: The method of Aspect 1, wherein multiple synchronization signal blocks are enabled for the UE without available measurement information, and wherein the method further comprises: pausing loop updates associated with selecting a serving beam for the SCC based at least in part on multiple synchronization signal blocks being enabled for the UE without available measurement information.

Aspect 11: The method of Aspect 1, wherein the reception of the indication of the second serving beam further comprises: receiving signaling indicating the second serving beam.

Aspect 12: The method of Aspect 1, wherein the reception of the indication of the second serving beam further comprises: selecting the second serving beam based at least in part on a synchronization signal block measurement associated with the second serving beam.

Aspect 13: A method of wireless communication performed by a network entity, comprising: establishing, with a user equipment (UE), a communication link using a first serving beam on a secondary component carrier (SCC); receiving a channel quality indicator associated with the first serving beam in association with a link failure of the first serving beam; receiving measurement information for one or more candidate serving beams; and switching the UE to a second serving beam, of the one or more candidate serving beams, for the SCC.

Aspect 14: The method of Aspect 13, wherein the measurement information includes at least one of: a Layer 1 reference signal received power (RSRP), or a Layer 3 RSRP.

Aspect 15: The method of Aspect 13, wherein the measurement information indicates one or more preferred beams that are quasi-colocated with the first serving beam, and wherein the reception of the measurement information further comprises: receiving a channel state information reference signal resource indicator indicating the one or more preferred beams in association with a synchronization signal block of the first serving beam.

Aspect 16: The method of Aspect 13, wherein the measurement information indicates one or more preferred beams that are quasi-colocated with a serving beam of the one or more candidate serving beams, and wherein the reception of the measurement information further comprises: receiving a channel state information reference signal resource indicator indicating the one or more preferred beams in association with a synchronization signal block of the one or more candidate serving beams.

Aspect 17: The method of Aspect 13, wherein the measurement information indicates one or more preferred beams that are not quasi-colocated with the first serving beam or the one or more candidate serving beams, and wherein the reception of the measurement information further comprises: receiving an arbitrary channel state information reference signal resource indicator.

Aspect 18: The method of Aspect 13, wherein the indication of the second serving beam indicates, via medium access control signaling, a transmission configuration indicator state associated with the second serving beam.

Aspect 19: The method of Aspect 13, wherein the measurement information is first measurement information, and wherein the establishment of the SCC associated with the first serving beam further comprises: selecting the first serving beam from second measurement information available prior to establishing the SCC associated with the first serving beam.

Aspect 20: The method of Aspect 13, wherein a single synchronization signal block is enabled for the UE, and wherein the establishment of the SCC associated with the first serving beam further comprises: selecting the single synchronization signal block for the first serving beam.

Aspect 21: The method of Aspect 13, further comprising: transmitting signaling indicating the second serving beam.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      establish a communication link using a first serving beam on a secondary component carrier (SCC);
      identify a link failure associated with the first serving beam;
      transmit, via the SCC and based at least in part on identifying the link failure associated with the first serving beam on the SCC, a channel quality indicator to a network entity;
      report measurement information for one or more candidate serving beams;
      receive an indication of a second serving beam from the one or more candidate serving beams; and
      switch from using the first serving beam to using the second serving beam for the SCC.

2. The UE of claim 1, wherein the one or more processors are further configured to:
   forego control channel monitoring on the first serving beam in association with the link failure.

3. The UE of claim 1, wherein the one or more processors are further configured to:
   track a measurement value for the first serving beam and the one or more candidate serving beams after transmitting the channel quality indicator.

4. The UE of claim 1, wherein the measurement information includes at least one of:
   a Layer 1 reference signal received power (RSRP), or
   a Layer 3 RSRP.

5. The UE of claim 1, wherein the measurement information indicates one or more preferred beams that are quasi-colocated with the first serving beam, and wherein the one or more processors, to report the measurement information, are configured to:
   transmit a channel state information reference signal resource indicator indicating the one or more preferred beams in association with a synchronization signal block of the first serving beam.

6. The UE of claim 1, wherein the measurement information indicates one or more preferred beams that are quasi-colocated with a serving beam of the one or more candidate serving beams, and wherein the one or more processors, to report the measurement information, are configured to:
   transmit a channel state information reference signal resource indicator indicating the one or more preferred beams in association with a synchronization signal block of the one or more candidate serving beams.

7. The UE of claim 1, wherein the indication of the second serving beam indicates, via medium access control signaling, a transmission configuration indicator state associated with the second serving beam.

8. The UE of claim 1, wherein the measurement information is first measurement information, and
   wherein the one or more processors, to establish the communication link, are configured to:
      select the first serving beam from second measurement information available prior to establishing the communication link.

9. The UE of claim 1, wherein a single synchronization signal block is enabled for the UE, and
   wherein the one or more processors, to establish the communication link, are configured to:
      select the single synchronization signal block for the first serving beam.

10. The UE of claim 1, wherein multiple synchronization signal blocks are enabled for the UE without available measurement information, and wherein the one or more processors are configured to:
    pause loop updates associated with selecting a serving beam for the SCC based at least in part on multiple synchronization signal blocks being enabled for the UE without available measurement information.

11. The UE of claim 1, wherein the one or more processors, to receive the indication of the second serving beam, are configured to:
    receive signaling indicating the second serving beam.

12. The UE of claim 1, wherein the one or more processors, to receive the indication of the second serving beam, are configured to:
    select the second serving beam based at least in part on a synchronization signal block measurement associated with the second serving beam.

13. A network entity for wireless communication, comprising:
a memory; and
one or more processors, coupled to the memory, configured to:
establish, for a user equipment (UE), a communication link using a first serving beam on a secondary component carrier (SCC);
receive, via the SCC, a channel quality indicator associated with the first serving beam in association with a link failure of the first serving beam on the SCC;
receive measurement information for one or more candidate serving beams; and
switch the UE from using the first serving beam to using a second serving beam, of the one or more candidate serving beams, for the SCC.

14. The network entity of claim 13, wherein the measurement information includes at least one of:
a Layer 1 reference signal received power (RSRP), or
a Layer 3 RSRP.

15. The network entity of claim 13, wherein the measurement information indicates one or more preferred beams that are quasi-colocated with the first serving beam, and wherein the one or more processors, to receive the measurement information, are configured to:
receive a channel state information reference signal resource indicator indicating the one or more preferred beams in association with a synchronization signal block of the first serving beam.

16. The network entity of claim 13, wherein the measurement information indicates one or more preferred beams that are quasi-colocated with a serving beam of the one or more candidate serving beams, and wherein the one or more processors, to receive the measurement information, are configured to:
receive a channel state information reference signal resource indicator indicating the one or more preferred beams in association with a synchronization signal block of the one or more candidate serving beams.

17. The network entity of claim 13, further comprising:
transmitting an indication of the second serving beam that indicates, via medium access control signaling, a transmission configuration indicator state associated with the second serving beam.

18. The network entity of claim 13, wherein the one or more processors are further configured to:
transmit signaling indicating the second serving beam.

19. A method of wireless communication performed by a user equipment (UE), comprising:
establishing a communication link using a first serving beam on a secondary component carrier (SCC);
identifying a link failure associated with the first serving beam;
transmitting, via the SCC and based at least in part on identifying the link failure associated with the first serving beam on the SCC, a channel quality indicator to a network entity;
reporting measurement information for one or more candidate serving beams;
receiving an indication of a second serving beam from the one or more candidate serving beams; and
switching from using the first serving beam to using the second serving beam for the SCC.

20. The method of claim 19, further comprising:
foregoing control channel monitoring on the first serving beam in association with the link failure.

21. The method of claim 19, further comprising:
tracking a measurement value for the first serving beam and the one or more candidate serving beams after transmitting the channel quality indicator.

22. The method of claim 19, wherein the measurement information includes at least one of:
a Layer 1 reference signal received power (RSRP), or
a Layer 3 RSRP.

23. The method of claim 19, wherein the measurement information indicates one or more preferred beams that are quasi-colocated with the first serving beam, and wherein the reporting of the measurement information further comprises:
transmitting a channel state information reference signal resource indicator indicating the one or more preferred beams in association with a synchronization signal block of the first serving beam.

24. The method of claim 19, wherein the measurement information indicates one or more preferred beams that are quasi-colocated with a serving beam of the one or more candidate serving beams, and wherein the reporting of the measurement information further comprises:
transmitting a channel state information reference signal resource indicator indicating the one or more preferred beams in association with a synchronization signal block of the one or more candidate serving beams.

25. A method of wireless communication performed by a network entity, comprising:
establishing, for a user equipment (UE), a communication link using a first serving beam on a secondary component carrier (SCC);
receiving, via the SCC, a channel quality indicator associated with the first serving beam in association with a link failure of the first serving beam on the SCC;
receiving measurement information for one or more candidate serving beams; and
switching the UE from using the first serving beam to using a second serving beam, of the one or more candidate serving beams, for the SCC.

26. The method of claim 25, wherein the measurement information includes at least one of:
a Layer 1 reference signal received power (RSRP), or
a Layer 3 RSRP.

27. The method of claim 25, wherein the measurement information indicates one or more preferred beams that are quasi-colocated with the first serving beam, and wherein the reception of the measurement information further comprises:
receiving a channel state information reference signal resource indicator indicating the one or more preferred beams in association with a synchronization signal block of the first serving beam.

28. The method of claim 25, wherein the measurement information indicates one or more preferred beams that are quasi-colocated with a serving beam of the one or more candidate serving beams, and wherein the reception of the measurement information further comprises:
receiving a channel state information reference signal resource indicator indicating the one or more preferred beams in association with a synchronization signal block of the one or more candidate serving beams.

29. The method of claim 25, further comprising:
transmitting an indication of the second serving beam that indicates, via medium access control signaling, a transmission configuration indicator state associated with the second serving beam.

30. The method of claim 25, further comprising:
transmitting signaling indicating the second serving beam.

\* \* \* \* \*